(12) United States Patent
Akiyama (10) Patent No.: US 9,804,485 B2
(45) Date of Patent: Oct. 31, 2017

(54) LIGHT SOURCE DEVICE, LIGHTING APPARATUS, AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/177,670

(22) Filed: Jun. 9, 2016

(65) Prior Publication Data

US 2016/0370696 A1 Dec. 22, 2016

(30) Foreign Application Priority Data

Jun. 18, 2015 (JP) .................. 2015-122661

(51) Int. Cl.
*G03B 21/20* (2006.01)
*H04N 9/31* (2006.01)
*G02B 27/14* (2006.01)

(52) U.S. Cl.
CPC ....... *G03B 21/2066* (2013.01); *G02B 27/141* (2013.01); *G03B 21/204* (2013.01); *G03B 21/208* (2013.01); *H04N 9/3105* (2013.01); *H04N 9/317* (2013.01); *G03B 21/2073* (2013.01); *H04N 9/3152* (2013.01); *H04N 9/3158* (2013.01)

(58) Field of Classification Search
CPC ............ G03B 21/2066; G03B 21/2033; G03B 21/2013; G03B 21/204; G03B 21/208; H04N 9/315; H04N 9/3155; H04N 9/3152; H04N 9/3158; H04N 9/3161; H04N 9/3164
See application file for complete search history.

(56) References Cited

U.S. PATENT DOCUMENTS

2014/0293232 A1* 10/2014 Tanaka ................ G03B 21/204
353/20

FOREIGN PATENT DOCUMENTS

JP 2013-250494 A 12/2013

* cited by examiner

*Primary Examiner* — Ryan Howard
(74) *Attorney, Agent, or Firm* — Oliff PLC (57) ABSTRACT

A light source device includes a light source, a fluorescent layer, a diffusive reflector, a first lens unit, a second lens unit, and a light separating and synthesizing unit. The light separating and synthesizing unit divides light coming from the light source into a first light and a second light. The first light passes through the first lens unit to enter the fluorescent layer. The second light passes through the second lens unit to enter the diffusive reflector. The size of a spot of the second light on the diffusive reflector is greater than the size of a spot of the first light on the fluorescent body layer.

15 Claims, 5 Drawing Sheets

LIGHT SOURCE DEVICE, LIGHTING APPARATUS, AND PROJECTOR

BACKGROUND

1. Technical Field

The present invention relates to a light source device, a lighting apparatus, and a projector.

2. Related Art

In recent years, as a light source device used for a projector, using a solid-state light source such as a semiconductor laser, from which light of high brightness and high output is obtained, has been attracting attention. In a technique described in JP-A-2013-250494, in order to uniformly illuminate a liquid crystal panel with light from the light source device, a superimposing optical system configured of two lens arrays and a superimposing lens is used, In the light source device, a diffused light that is generated by diffusing some of light from the semiconductor laser and fluorescence that is generated by causing remaining light from the semiconductor laser to be incident on a fluorescent body layer are synthesized.

However, since bleeding of fluorescence occurs in the fluorescent body layer, but bleeding of fluorescence is not considered in the light source device, a diameter of a light condensing spot formed in a diffusion plate generating the diffused light is approximately equal to a diameter of a light condensing spot formed in the fluorescent body layer. Thus, a difference in size of a light emitting region occurs between the fluorescent body layer and the diffusion plate. Thus, there is a problem that superimposing performance of the superimposing optical system is different depending on colors and color unevenness occurs in an image.

SUMMARY

An advantage of some aspects of the invention is to provide a light source device in which color unevenness is reduced. Another advantage of some aspects of the invention is to provide a lighting apparatus including the light source device. Still another advantage of some aspects of the invention is to provide a projector including the lighting apparatus.

According to a first aspect of the Invention, a light source device is provided. The light source device includes: a light source; a light separating and synthesizing unit that separates a light beam flux from the light source into a first light beam flux and a second light beam flux; a fluorescent body layer on which the first light beam flux is incident; a diffusive reflector on which the second light beam flux is incident; a first lens unit that is provided in an optical path of the first light beam flux between the light separating and synthesizing unit and the fluorescent body layer; and a second lens unit that is provided in an optical path of the second light beam flux between the light separating and synthesizing unit and the diffusive reflector. The fluorescent light emitted from the fluorescent body layer and the diffused light emitted, from the diffusive reflector are synthesized by the light separating and synthesizing unit. A size of a spot of the second light beam flux on the diffusive reflector is greater than a size of a spot of the first light beam flux on the fluorescent body layer.

In the light source device according to the first aspect, the size of the spot on the diffusive reflector is greater than the size of the spot on the fluorescent body layer. Thus, it is possible to reduce a difference between a size of a light emitting region of the fluorescent body layer in which bleeding occurs and a size of the light emitting region of the diffusive reflector in which bleeding does not occur. Therefore, it is possible to reduce color unevenness.

In the first aspect described above, it is preferable that a focal, length of the second lens unit is longer than a focal length of the first lens unit.

According to this configuration, it is possible to make the size of the spot on the diffusive reflector greater than the size of the spot on the fluorescent body layer easily and reliably.

In the first aspect described above, it is preferable that a size of a spot of the second light beats flux on the diffusive reflector is approximately equal to a size of a light emitting region of the fluorescent body layer.

According to this configuration, it is possible to approximately equalize the size of the light emitting region between the fluorescent body layer in which bleeding occurs and the diffusive reflector in which bleeding does not occur. Thus, it is possible to further reduce: the occurrence of color unevenness. In the present specification, a region in the fluorescent body layer, the region from which the fluorescent light is emitted, is referred to as the light emitting region of the fluorescent body layer. In addition, a region in the diffusive reflector, the region emitting the diffused light, is referred to as the light emitting region- of the diffusive reflector.

In the first aspect described above, it is preferable that the second lens unit causes a spot of the second light beam flux on the diffusive reflector to be in a defocus state.

According to this configuration, it is possible to easily make the size of the spot of the second light beam flux greater than the size of the spot of the first light beam flux, In the first aspect described above, it is preferable that when a size of the light emitting region is D1, a size of a spot of the first light beam flux is D2, and a size of a spot of the second light beam flux is D3, the following condition is satisfied, $$|D1-D3|<D1-D2$$

According to this configuration, it is possible to further reduce color unevenness compared to a case where a condition of D3=D2 is satisfied.

According to a second aspect of the invention, a lighting apparatus is provided. The lighting apparatus includes: the light source device according to the first aspect; arid a uniform lighting optical system on which light emitted from the light source device is incident.

In the lighting apparatus according to the second aspect, since the light source device described above is provided, it is possible to obtain lighting light in which color unevenness is reduced.

According to a third aspect of the invention, a projector is provided. The projector includes: the lighting apparatus according to the second aspect; a light modulation device that forms image light by modulating light emitted from the lighting apparatus according to image information; and a projection optical system that projects the image light.

In the projector according to the third aspect, since the lighting apparatus described above is provided, it is possible to display an image in which color unevenness is reduced.

BRIEF DESCRIPTION OF THE DRAWINGS

The invention will foe described with reference to the accompanying drawings, wherein like numbers reference like elements.

DESCRIPTION OF EXEMPLARY EMBODIMENTS

First Embodiment

Hereinafter, an embodiment, of the invention will be described in detail with reference to the drawings.

Moreover, in order to facilitate understanding of features, the drawings used in the following description may have enlarged portions becoming the features for the sake of convenience. A dimensional ratio of each configuration element and the like are not limited to the same as those in actuality.

Projector

First, an example of a projector 1 illustrated in FIG. 1 will be described.

Figure 1:
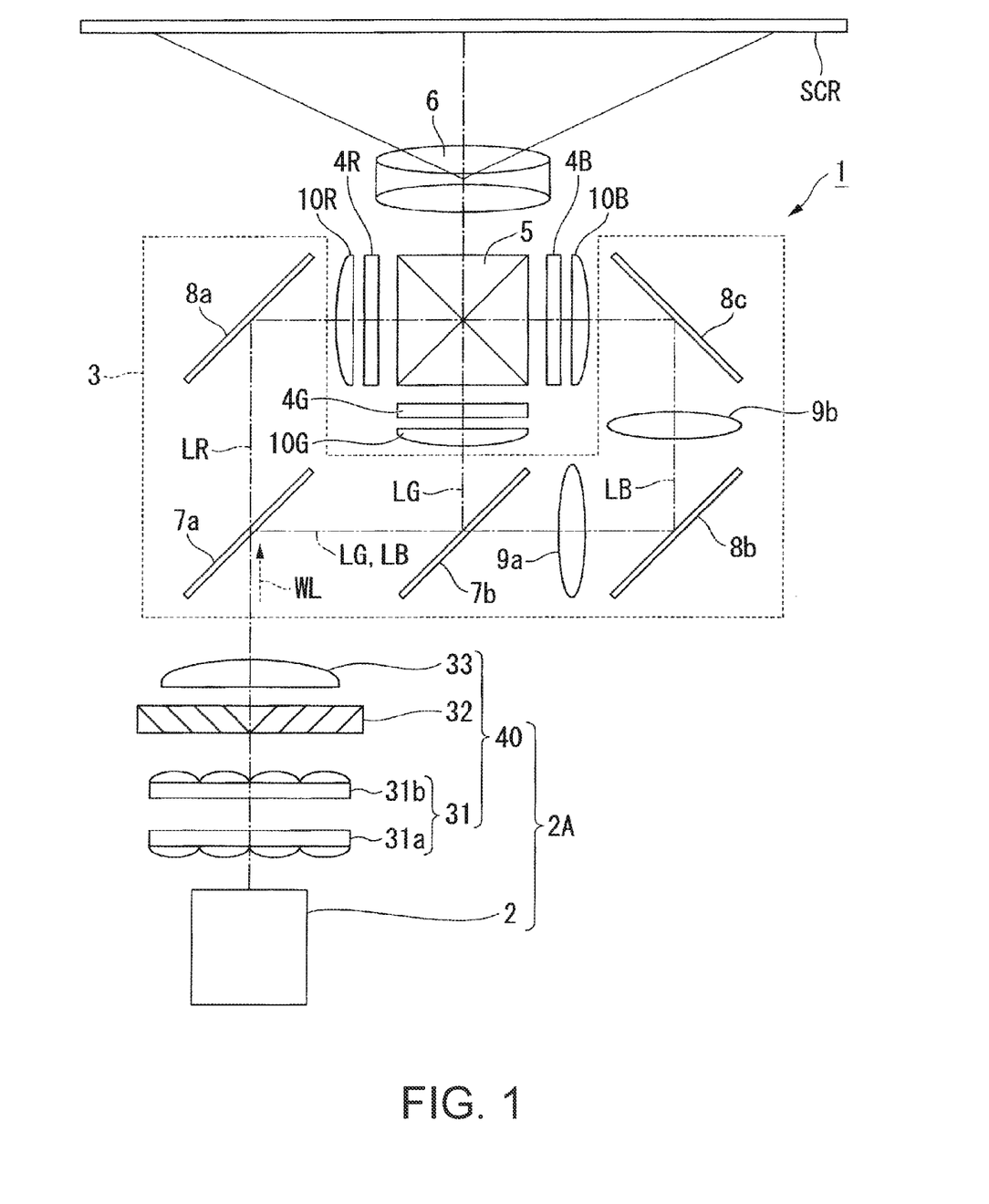
FIG. 1 is a plan view illustrating a schematic configuration of a projector according to a first embodiment.

FIG. 1 is a plan view illustrating a schematic configuration of the projector 1.

The projector 1 of the embodiment is a projection type image display apparatus for displaying a color video (image) on a screen (projection surface) SCR. The projector 1 uses three optical modulation devices corresponding to each color light of red light LR, green light LG, and blue light LB. The projector 1 uses a semiconductor laser (laser light source) as a light source of a lighting apparatus from which light of high luminance and high output is obtained.

Specifically, as illustrated in FIG. 1, the projector 1 mainly includes a lighting apparatus 2A, a color separation optical system 3, an optical modulation device 4R, an optical modulation device 4G, an optical modulation device 4B, a synthesis optical system 5, and a projection optical system 6.

The lighting apparatus 2A emits lighting light WL as lighting light to the color separation optical system 3, The lighting apparatus 2A includes a light source device 2 and a uniform lighting light optical system 40.

The uniform lighting light optical system 40 includes an integrator optical system 31, a polarization conversion element 32, and a superimposing optical system 33. Moreover, the polarization conversion element 32 is not essential. The uniform lighting light optical system 40 makes the intensity of the lighting light WL emitted from the light source device 2 uniform in a lighting area. The lighting light WL emitted from the uniform lighting light optical system 40 is incident on the color separation optical system 3.

The color separation optical system 3 is provided to separate the lighting light WL into the red light LR, the green light LG, and the blue light LB. The color separation optical system 3 mainly includes a first dichroic mirror 7a, a second dichroic mirror 7b, a first total reflection mirror 8a, a second total reflection mirror 8b, a third total-reflection mirror 8c, a first relay lens 9a, and a second relay lens 9b.

The first dichroic mirror 7a has a function of separating the lighting light WL from the light source device 2 into the red light LR and other light (green light LG and the blue light LB). The first dichroic mirror 7a transmits the separated red light LR and reflects other light (green light LG and the blue light LB). On the other hand, the second dichroic mirror 7b has a function of separating the other light into the green light LG and the blue light LB. The second dichroic mirror 7b reflects the green light LG and transmits the blue light LB which are separated.

The first total reflection mirror 8a is disposed in an optical path of the red light LR and reflects the red light LR transmitted by the first, dichroic mirror 7a to the optical modulation device 4R. On the other hand, the second total reflection mirror 8b and the third total reflection mirror 8c are disposed in an optical path of the blue light LB and reflect the blue light LB transmitted by the second dichroic mirror 7b to the optical modulation device 4B. Moreover, it is not necessary to dispose a total reflection mirror in an optical path of the green light LG and the green light LG is reflected to the optical modulation, device 4G by the second dichroic mirror 7b.

The first relay lens 9a and the second relay lens 9b are disposed on a light emission side of the second dichroic mirror 7b in the optical path of the blue light LB. The first relay lens 9a and the second relay lens 9b have a function of compensating for optical loss of the blue light LB which is caused by the fact that a length of the optical path of the blue light LB is longer than a length of the optical path of the red light LR or the green light LG.

The optical modulation device 4R modulates the red light LR depending on image information and forms image light corresponding to the red light LR while causing the red light LR to pass through. The optical modulation device 4G modulates the green light LG depending on image information and forms image light corresponding to the green light LG while causing the green light LG to pass through. The optical modulation device 4B modulates the blue light LB depending on image information and forms image light corresponding to the blue light LB while causing the blue light LB to pass through.

For the optical modulation device 4R, the optical modulation device 4G, and the optical modulation device 4B, for example, a transmission type liquid crystal panel is used. In addition, a pair of polarising plates (not illustrated) are disposed on an incident side and an emission side of the liquid crystal panel and are configured to cause only linear polarised light in a specific direction to pass through.

A field lens 10R, a field lens 10G, and a field lens 10E are respectively disposed on the incident side of the optical modulation device 4R, the optical modulation device 4G, and the optical modulation device 4B. The field lens 10R, the field lens 10G, and the field lens 10B are used to collimate the red light LR, the green light LG, and the blue light LB incident on the optical modulation device 4R, the optical modulation device 4G, and the optical modulation device 4B respectively.

The synthesis optical system 5 synthesizes the image light corresponding to the red light LR, the green light LG, and the blue light LB by causing the image light from the optical modulation device 4R, the optical modulation device 4G, and the optical modulation device 4B to be incident, and emits synthesized image light to the projection optical system 8. For the synthesis optical system 5, for example, a cross dichroic prism is used.

The projection optical system 6 is configured of a projection lens group. The projection optical system 6 projects the image light synthesized by the synthesis optical system 5 to the screen SCR in an enlargement manner. Thus, an enlarged color video (image) is displayed on the screen SCR.

Light Source Device

Next, a specific embodiment of a light source device to which one aspect of the invention used in the lighting apparatus 2A is applied will be described.

Figure 2:
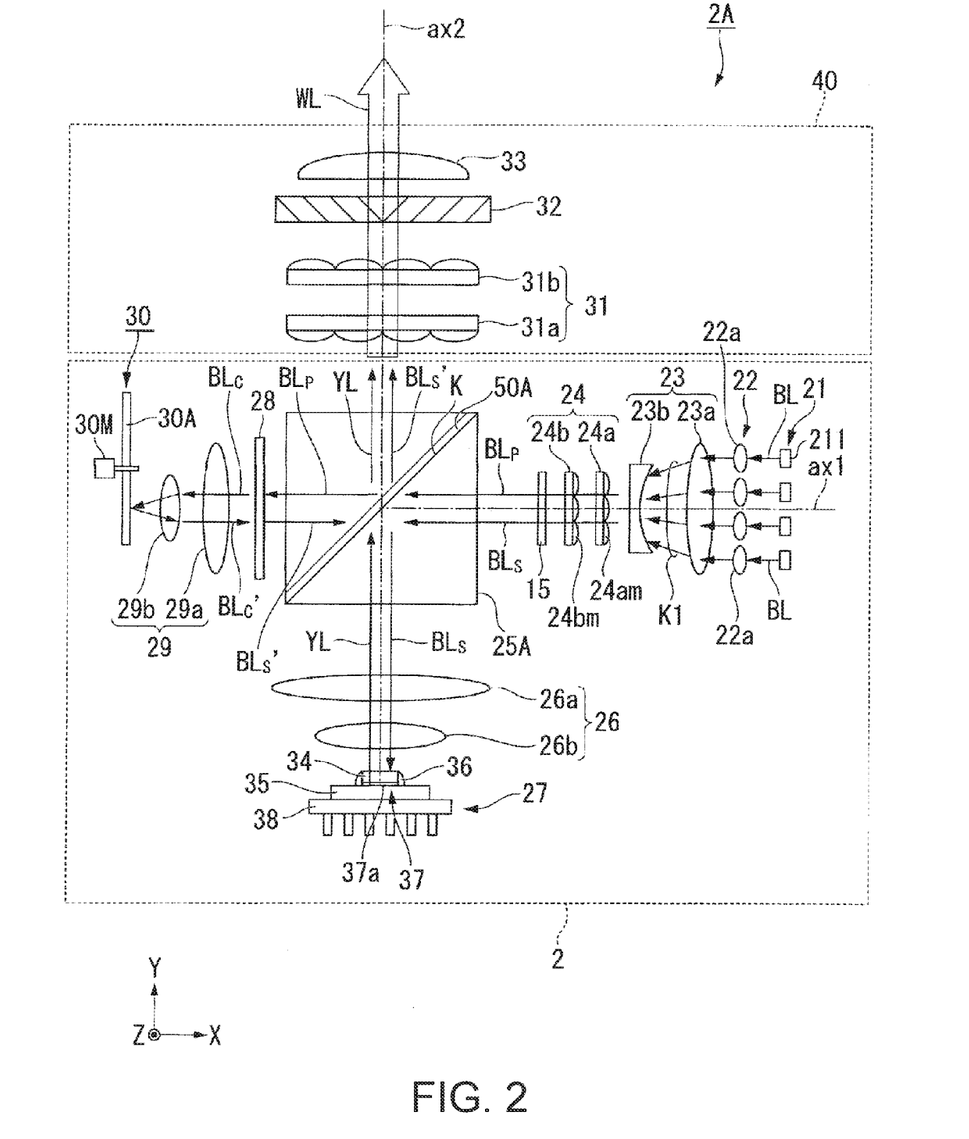
FIG. 2 is a plan view illustrating a schematic configuration of a light source device.

FIG. 2 is a plan view illustrating a schematic configuration of the light source device 2.

As illustrated in FIG. 2, the light source device 2 mainly includes an array light source 21, a collimator optical system 22, an afocal optical system 23, a homogenizer optical system 24, a first phase difference plate 15, an optical element 25A having a polarization separation element 50A, a first light condensing optical system 26, a fluorescent light emitting element 27, a second phase difference plate 28, a second light condensing optical system 29, and a diffusion reflection element 30. Moreover, the array light source 21 of the embodiment corresponds to the "light source" of the appended claims.

Among these configuration elements, the array light source 21, the collimator optical system 22, the a focal optical system 23, the homogenizer optical system 24, the first phase difference plate 15, the optical element 25A, the second phase difference plate 28, the second light condensing optical system 29, and the diffusion reflection element 30 are arranged side by side in this order on an optical axis ax1. On the other hand, the fluorescent light emitting element 27, the first light condensing optical system 26, and the optical element 25A are arranged side by side in this order on an optical axis ax2. The optical axis ax1 and the optical axis ax2 are located in the same plane and have a positional relationship perpendicular to each other. Moreover, the first light condensing optical system 26 corresponds to the "first lens unit" of the appended claims and the second light condensing optical system 29 corresponds to the "second lens unit" of the appended claims.

The array light source 21 includes a plurality of semiconductor lasers 211 as a solid-state light source. The plurality of semiconductor lasers 211 are arranged in an array shape in a plane orthogonal to the optical axis ax1. The semiconductor lasers 211 emit, for example, the blue light beam BL (for example, laser light of which a peak wavelength is 460 nm). In the embodiment, the array light source 21 emits a light beam flux K1 composed of a plurality of light beams BL.

The light beam flux K1 emitted from the array light source 21 is incident on the collimator optical system 22. The collimator optical system 22 converts the light beam flux K1 emitted from the array light source 21 into a parallel light beam. The collimator optical system 22 is configured of, for example, a plurality of collimator lenses 22a arranged side by side in an array shape. Each of the plurality of collimator lenses 22a is arranged corresponding to the plurality of semiconductor lasers 211.

The light beam, flux K1 passing through the collimator optical system 22 is incident on the afocal optical system 23. The afocal optical system 23 adjusts a light flux diameter of the light beam flux K1. The afocal optical system 23 is configured of, for example, a convex lens 23a and a concave lens 23b.

The light beam flux K1 passing through the afocal optical system 23 is incident on the homogenizer optical system 24. The homogenizer optical system 24 is configured of, for example, a first lens array 24a and a second lens array 24b. The first lens array 24a includes a plurality of first small lenses 24am and the second lens array 24b includes a plurality of second small lenses 24bm.

The light beam flux K1 passing through the homogenizer optical system 24 is incident on the first phase difference plate 15. The first phase difference plate 15 is, for example, a half-wave plate arranged to be rotatable. The light beam BL emitted from the semiconductor laser 211 is linear polarized light. It is possible to make the light beam BL transmitted by the first phase difference plate 15 light including an S polarised light component and a P polarised light component with respect to the optical element 25A at a predetermined ratio by appropriately setting a rotational angle of the half-wave plate. It is possible to change the ratio of the S polarised light component and the P polarised light component by rotating the first phase difference plate 15.

The optical element 25A is configured of, for example, a dichroic prism having wavelength selectivity. The dichroic prism has an inclined surface K at an angle of 45° with respect to the optical axis ax1. The inclined surface K also has an angle of 45° with respect to the optical axis ax2. The optical element 25A is disposed so that an intersection point of the optical axes ax1 and ax2 orthogonal to each other and an optical center of the inclined surface K coincide with each other. Moreover, the optical element 25A is not limited to the prism shape such as the dichroic prism, and a parallel plate-shaped dichroic mirror may be used.

The polarization separation element 50A having wavelength selectivity is provided in the inclined surface K. The polarisation separation element 50A has a polarisation separating function to separate the light beam flux K1 passing through the first phase difference plate 15 into the S polarized light component and the P polarized light component with respect to the polarization separation element 50A. Specifically, the polarisation separation element 50A reflects the S polarized light component in the incident light and transmits the P polarised light component in the incident light. The S polarised light component (light beam flux BLs) is directed, to the fluorescent light emitting element 27 by being reflected on the polarization separation element 50A. The P polarised light component (light beam flux BLp) is directed to the diffusion reflection element 30 by being transmitted by the polarization separation element 50A.

The polarisation separation element 50A has a color separation function to transmit fluorescent light YL of which a wavelength band is different from that of the light beam flux K1 described below irrespective of a polarisation state. In addition, the polarisation separation element 50A has a light synchronization function to synthesize light reflected by the diffusion reflection element 30 described below and the fluorescent light YL. The polarization separation element 50A corresponds to the "light separating and synthesizing unit" of the appended claims.

The light beam flux BLs of S-polarized light emitted from the polarization separation element 50A is incident on the first, light condensing optical system 26. The first light condensing optical system 26 condenses the light beam flux BLs to a fluorescent body layer 34 of the fluorescent light emitting element 27. In addition, the first light condensing optical system 26 makes an illuminance distribution by the light beam flux BLs on the fluorescent body layer 34 uniform by cooperating with the homogenizer optical system 24. The first light condensing optical system 26 is configured of, for example, pickup lenses 26a and 26b. Moreover, the light beam flux BLs of the S-polarized light corresponds to the first light beam flux of the appended claims.

The light beam flux BLs emitted from the first light condensing optical system 26 is incident on the fluorescent light emitting element 27. In the embodiment, the fluorescent light emitting element 27 is disposed in a focal point position of the first light condensing optical system 26.

The fluorescent light emitting element 27 has the fluorescent body layer 34, a substrate 35 for supporting the fluorescent body layer 34, and a fixing member 36 for fixing the fluorescent body layer 34 to the substrate 35.

In the fluorescent light emitting element 27, in a state where a surface on a side opposite to a side on which the light beam flux BLs of the fluorescent body layer 34 is incident comes into contact with the substrate 35, the fluorescent body layer 34 is fixed and supported on the substrate 35 by the fixing member 36 provided between a side surface of the fluorescent body layer 34 and the substrate 35.

The fluorescent body layer 34 includes fluorescent body particles emitting the light beam flux BLs by converting the light beam flux BLs into yellow fluorescent light YL by absorbing the light beam flux BLs. As the fluorescent body particles, for example, it is possible to use a YAG (yttrium aluminum garnet)-based fluorescent body. Moreover, a formation material of the fluorescent body particles may be one type of a material or a material that is obtained by mixing particles formed by using material of two or more types of materials may be used as the fluorescent body particles.

For the fluorescent body layer 34, it is preferable that a material which is excellent in heat resistance and surface processability is used. For such a fluorescent body layer 34, for example, it is possible to preferably use a fluorescent body layer that is obtained by dispersing the fluorescent body particles in an inorganic binder such as alumina, a fluorescent body layer that is obtained by sintering the fluorescent body particles without using a binder, and the like.

A reflection section 37 is provided on a side opposite to the side on which the light beam flux BLs of the fluorescent body layer 34 is incident. The reflection section 37 has a function of reflecting some of the fluorescent light YL in the fluorescent light YL generated by the fluorescent body layer 34.

It is preferable that the reflection section 37 is configured of a specular reflective surface. In the fluorescent light emitting element 27, it is possible to effectively emit the fluorescent light YL from the fluorescent body layer 34 by performing specular reflection of the fluorescent light YL generated by the fluorescent body layer 34 in the reflection section 37.

Specifically, the reflection section 37 can be configured by providing a reflection film 37a on a surface on a side opposite to the side on which the light beam flux BLs of the fluorescent body layer 34 is incident. In this case, a surface of the reflection film 37a facing the fluorescent body layer 34 becomes the specular reflective surface. The reflection section 37 may be a structure formed of a base material in which the substrate 35 has light reflecting characteristics. In this case, it is possible to make the surface the specular reflective surface by omitting the reflection film 37a and making the surface of the substrate 35 facing the fluorescent body layer 34 a specular surface.

For the fixing member 36, it is preferable that inorganic adhesive having the light reflecting characteristics is used. In this case, it is possible to reflect light leaked from the side surface of the fluorescent body layer 34 on the inside of the fluorescent body layer 34 by the inorganic adhesive having the light reflecting characteristics. Thus, it is possible: to further increase light extraction efficiency of the fluorescent light YL generated by the fluorescent body layer 34.

A heat sink 38 is disposed on a surface of the substrate 35 on a side opposite to the surface on which the fluorescent body layer 34 is supported. In the fluorescent light emitting element 27, since it is possible to radiate heat via the heat sink 38, it is possible to prevent thermal deterioration of the fluorescent body layer 34.

Some of the fluorescent light YL in the fluorescent light YL generated by the fluorescent body layer 34 is reflected by the reflection section 37 and is emitted to the outside of the fluorescent body layer 34. In addition, the rest of the fluorescent light YL in the fluorescent light YL generated by the fluorescent body layer 34 is emitted to the outside of the fluorescent body layer 34 without the reflection section 37. Therefore, the fluorescent light. YL is emitted from the fluorescent body layer 34 to the first light condensing optical system 26.

The fluorescent light XL emitted from the fluorescent body layer 34 is transmitted by the first light condensing optical system 26 and the polarisation separation element 50A.

Figure 3A:
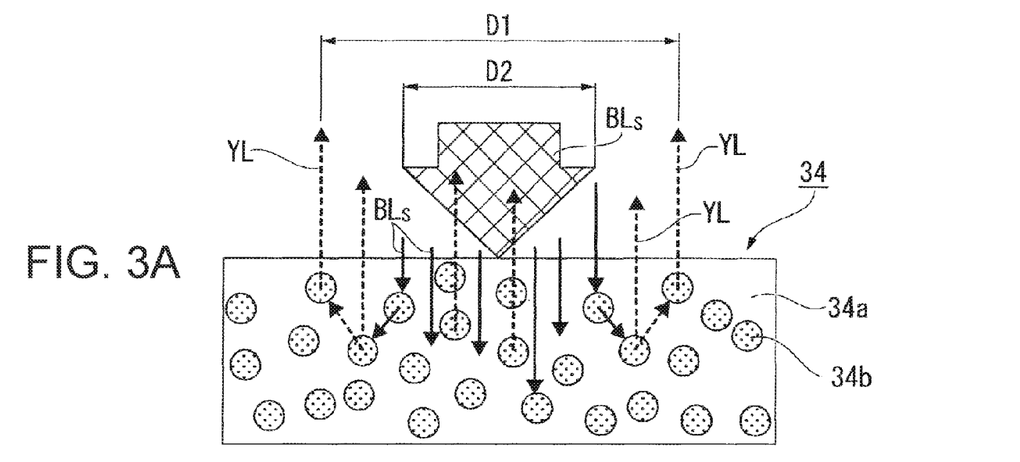
FIGS. 3A and 3B are views describing a bleeding phenomenon.
Figure 3B:
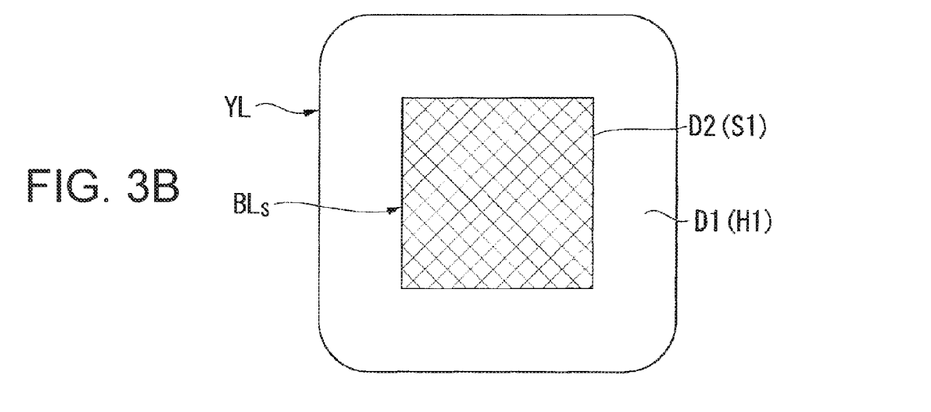

A size of a light emitting region of the fluorescent body layer 34 is greater than a size of a spot of excitation light (light beam flux BLs) by a bleeding phenomenon. FIGS. 3A and 3B are views describing the bleeding phenomenon, FIG. 3A is a sectional view of the fluorescent body layer 34, and FIG. 3B is a plan view of the fluorescent body layer 34.

As illustrated in FIG. 3A, in the fluorescent body layer 34 of the embodiment, for example, fluorescent body particles 34b are dispersed in a binder 34a. A spot S1 illustrated in FIG. 2B is a region in which the excitation light is applied to the fluorescent body layer 31. The excitation light incident on the spot S1 spreads while being refracted or reflected. Thus, the excitation light is applied to the fluorescent body particles 34b disposed on the outside of the spot S1 in a plan view. Furthermore, the fluorescent light YL emitted from the fluorescent body particles 34b also spreads while being refracted or reflected. Thus, as illustrated in FIG. 3B, a size B1 of a light emitting region H1 of the fluorescent body layer 34 is greater than a size D2 of the spot S1 for bleeding.

Here, as illustrated in. FIG. 3B, the light emitting region H1 of the fluorescent body layer 34 becomes a shape that is obtained by concentrically enlarging the spot S1 of the light beam flux BLs by approximately 0.2 mm to 0.3 mm. Moreover, an expansion amount (0.2 mm to 0.3 mm described above) of the light emitting region H1 by bleeding is substantially constant regardless of the size of the spot S1.

On the other hand, the light beam flux BLp of P-polarized light emitted from the polarization separation element 50A is incident on the second phase difference plate 28. Moreover, the light beam flux BLp of the P-polarized light corresponds to the second light beam flux of the appended claims.

The second phase difference plate 28 is configured of a quarter-wave plate (λ/4 plate) disposed in an optical path between the polarisation separation element 50A and the diffusion reflection element 30. The light beam flux BLp is converted into light beam flux BLc of circularly polarized light by passing through, the second phase difference plate 28. The light beam flux BLc passing through the second phase difference plate 28 is incident on the second light condensing optical system 29.

The second light condensing optical system 29 condenses the light, beam flux BLc to the diffusion reflection element 30. The second light condensing optical system 29 is configured of, for example, a pickup lens 29a and a pickup lens 29b. In addition, the second light condensing optical system 29 makes the illuminance distribution by the light beam flux BLc on the diffusion reflection element 30 uniform by cooperating with the homogenizer optical system 24. In the embodiment, the diffusion reflection element 30 (diffusion reflection plate 30A) is disposed in the focal point position of the second light condensing optical system 29.

The diffusion reflection element 30 diffuses and reflects the light beam flux BLc emitted from the second light condensing optical system 29 to the polarization separation element 50A. The light reflected by the diffusion reflection element 30 is referred to as light beam flux BLc'. The light beam flux BLc' corresponds to the diffused light in the appended claims. For the diffusion reflection element 30, it is preferable to use one Lambertian-reflecting the light beam flux BLc incident on the diffusion reflection element 30.

The diffusion reflection element 30 includes the diffusion reflection plate 30A and a driving source 30M such as a motor for rotating the diffusion reflection plate 30A. The diffusion reflection plate 30A can be manufactured by forming unevenness on a surface of a member having, for example, light reflectivity. A rotation shaft of the driving source 30M is disposed substantially parallel to the optical axis ax1. Therefore, the diffusion reflection plate 30A is configured to be rotatable in a surface intersecting main light beam of the light beam flux BLc incident on the diffusion reflection plate 30A. The diffusion reflection plate 30A is formed in, for example, a circular shape when viewed from a direction of the rotation shaft.

The light beam flux BLc (diffused light) of the circularly polarized light, which is reflected by the diffusion reflection plate 30A and transmitted again by the second light condensing optical system 23, is transmitted again by the second phase difference plate 28 and becomes light beam flux BLs' of the S-polarized light.

Since the diffusion reflection plate 30A is configured of the member having unevenness in the surface, when the light beam, flux BLc is reflected on the diffusion reflection plate 30A, bleeding does not occur. That is, a light flux diameter immediately after the light beam flux BLc' is reflected on the diffusion reflection plate 30A is substantially equal to a light flux: diameter immediately before the light beam flux BLc is incident on the diffusion reflection plate 30A. However, the light beam flux BLc' is gradually spread immediately after reflecting on the diffusion reflection plate 30A.

In the present specification, a region in which the light beam flux BLc' is emitted from the diffusion reflection element 30 is referred to as the light emitting region of the diffusion reflection element 30. A spot S2 of the light beam flux BLc on the diffusion reflection element 30 corresponds to the light emitting region of the diffusion reflection element 30, The light beam flux BLs' (blue light) is synthesized with the fluorescent light YL transmitted by the polarisation separation element 50A and thereby white lighting light WL is generated.

Meanwhile, if there is a difference between the size of the light emitting region of the diffusion reflection element 30 and the size of the light emitting region of the fluorescent body layer 34, color unevenness occurs in the lighting light WL.

Figure 4:
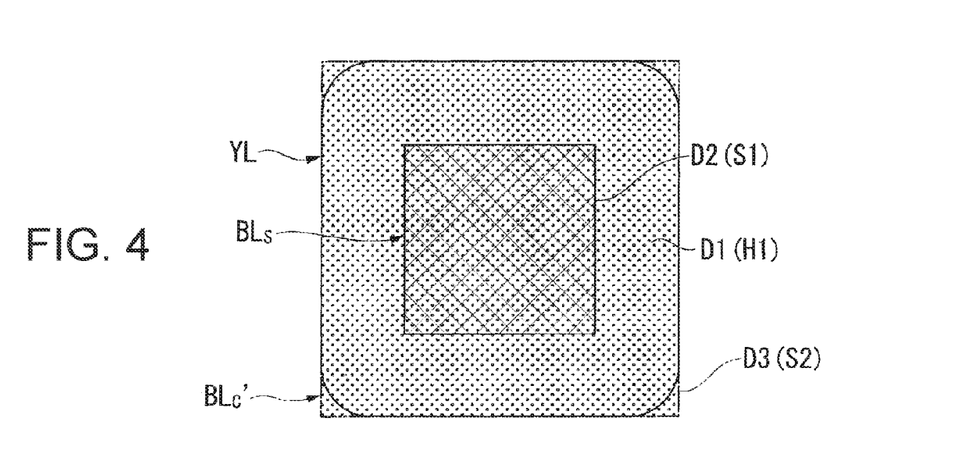
FIG. 4 is a view illustrating a size of a spot of each light beam flux.

On the other hand, in the embodiment, as illustrated in FIG. 4, a size D3 of the spot S2 (light emitting region of the diffusion reflection element 30) of the light beam flux BLc on the diffusion reflection element 30 is greater than the size D2 of the spot S1 of the light beam flux BLs on the fluorescent body layer 34. Moreover, FIG. 4 is a view illustrating the sizes of the spot 82 of the light beam flux BLc and the spot S1 of the light beam flux BLs.

In the embodiment, the size D3 of the spot S2 of the light beam flux BLc is equal to the size D1 of the light emitting region H1 of the fluorescent light YL.

In the embodiment, when the expansion amount (=D1−D2) of the light emitting region H1 by bleeding is (5, the size of each of the spots 51 and S2 is set so as to satisfy a condition of D3=β+D2. That is, the light source device 2 of the embodiment satisfies a relationship of D3>D2.

In addition, it is riot necessary to always satisfy the condition of D3=β+D2. The size D3 of the spot S2 may be approximately equal to the size D1 of the light emitting region H1 of the fluorescent light YL. Furthermore, the following condition may be satisfied.

|D1−D3|<D1−D2

It is possible to reduce color unevenness by satisfying the condition more than a case where a condition of D3=D2 is satisfied.

Therefore, it is possible to reduce the difference between the size of the light emitting region of the fluorescent body layer 34 in which bleeding occurs and the size of the light emitting region of the diffusion reflection element 30 in which bleeding does not occur.

Specifically, in the light source device 2 of the embodiment, a focal length of the second light condensing optical system 29 is longer than a focal length of the first light condensing optical system 26 so as to satisfy the condition (D3=β+D2) described above.

Hereinafter, the relationship between the focal length and the size of the spot will be described.

Here, the focal length of the second light condensing optical system 29 is $f_2$, the focal length of the first light condensing optical system 26 is $f_1$, the size of the first small lens 24am of the first lens array 24a configuring the homogenizer optical system 24 is L, and the focal length of the second small lens 24bm of the second lens array 24b configuring the homogenizer optical system 24 is $f_3$.

The size D2 of the spot S1 of the light beam flux BLs on the fluorescent body layer 34 and the size D3 of the spot: S2 of the light beam flux BLc on the diffusion reflection element 30 are respectively represented by the following Expression (1) and Expression (2).

$$D2=(f_1 \times L)/f_3 \qquad \text{Expression (1)}$$

$$D3=(f_2 \times L)/f_5 \qquad \text{Expression (2)}$$

It can be seen from Expressions (1) and (2) described above that the condition of D3>D2 can be satisfied by making the focal length $f_2$ of the second light condensing optical system 29 longer than the focal length $f_1$ of the first light condensing optical system 26.

According to the light, source device 2 of the embodiment, since the difference between the size of the light emitting region of the fluorescent body layer 34 and the size of the light emitting region of the diffusion reflection element 30 is small, it is possible to reduce color unevenness of the lighting light WL.

The lighting light WL in which color unevenness is reduced is incident on the uniform lighting light optical system 40 (integrator optical system 31) illustrated in FIGS. 1 and 2.

The integrator optical system 31 is configured of, for example, a lens array 31a and a lens array 31b. The lens arrays 31a and 31b are formed of a plurality of lenses arranged in an array shape.

The lighting light WL transmitted by the integrator optical system 31 is incident on the polarization conversion element 32. The polarization conversion element 32 is configured of, for example, a polarization separating film and a phase difference plate, and converts the lighting light WL into the linear polarized light.

The lighting light WL passing through the polarization conversion element 32 is incident on the superimposing optical system 33. The superimposing optical system 33 is configured of, for example, a superimposing lens and superimposes the lighting light WL emitted from the polarisation conversion element 32 on the lighting area. In the embodiment, the illuminance distribution is caused to be uniform in the lighting area by the integrator optical system 31 and the superimposing optical system 33.

According to the lighting apparatus 2A of the embodiment, it is possible to emit the lighting light WL in which color unevenness is reduced to the lighting area with uniform illuminance distribution. Thus, according to the projector 1 of the embodiment including the lighting apparatus 2A, it is excellent in display quality.

Second Embodiment

Next, a light source device of the second embodiment will be described. In addition, a difference between the embodiment and the embodiment described above is a method of adjusting the size of the spot. Thus, the same reference numerals are given to the common configurations as the embodiment described above and the description will be omitted or simplified.

Figure 5:
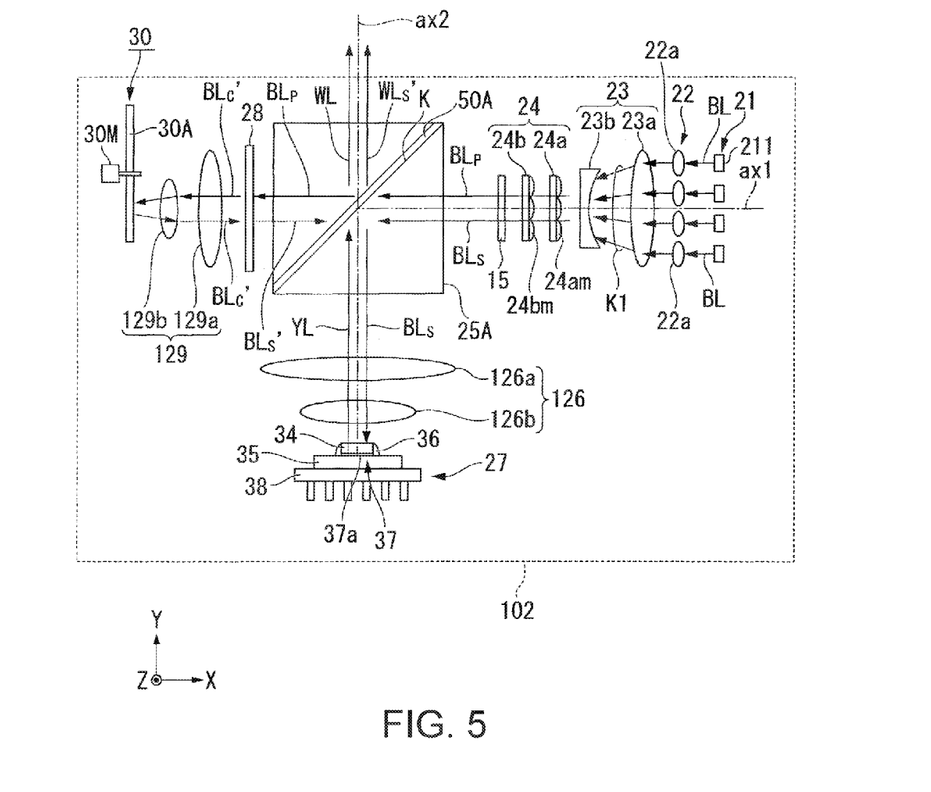
FIG. 5 is a plan view illustrating a schematic configuration of a light source device of a second embodiment.

FIG. 5 is a plan view illustrating a schematic configuration of a light source device 102 of the embodiment, As illustrated in FIG. 5, the light source device 102 mainly includes an array light source 21, a collimator optical system 22, an afocal optical system 23, a homogenizer optical system 24, a first phase difference plate 15, an optical element 25A, a first light condensing optical system 126, a fluorescent light emitting element 27, a second phase difference plate 28, a second light condensing optical, system 129, and a diffusion reflection element 30.

In the embodiment, the first light condensing optical system 126 and the second light condensing optical system 129 are different from those of the first embodiment and focal lengths are equal to each other. The first light condensing optical system 126 is configured of, for example, lenses 126a and 126b. The second light condensing optical system 129 is configured of, for example, lenses 129a and 129b. Moreover, the first light condensing optical system 126 corresponds to the "first lens unit" of the appended claims and the second light condensing optical system 129 corresponds to the "second lens unit" of the appended claims.

If the focal lengths of the first light condensing optical system 126 and the second light condensing optical system 129 are equal to each other, as represented by Expressions (1) and (2) described above, a size of a spot of the light beam flux BLc on the diffusion reflection element 30 is equal to a size of a spot of the light beam flux BLs on the fluorescent body layer 34 and a relationship of D3>D2 is not satisfied.

Figure 6:
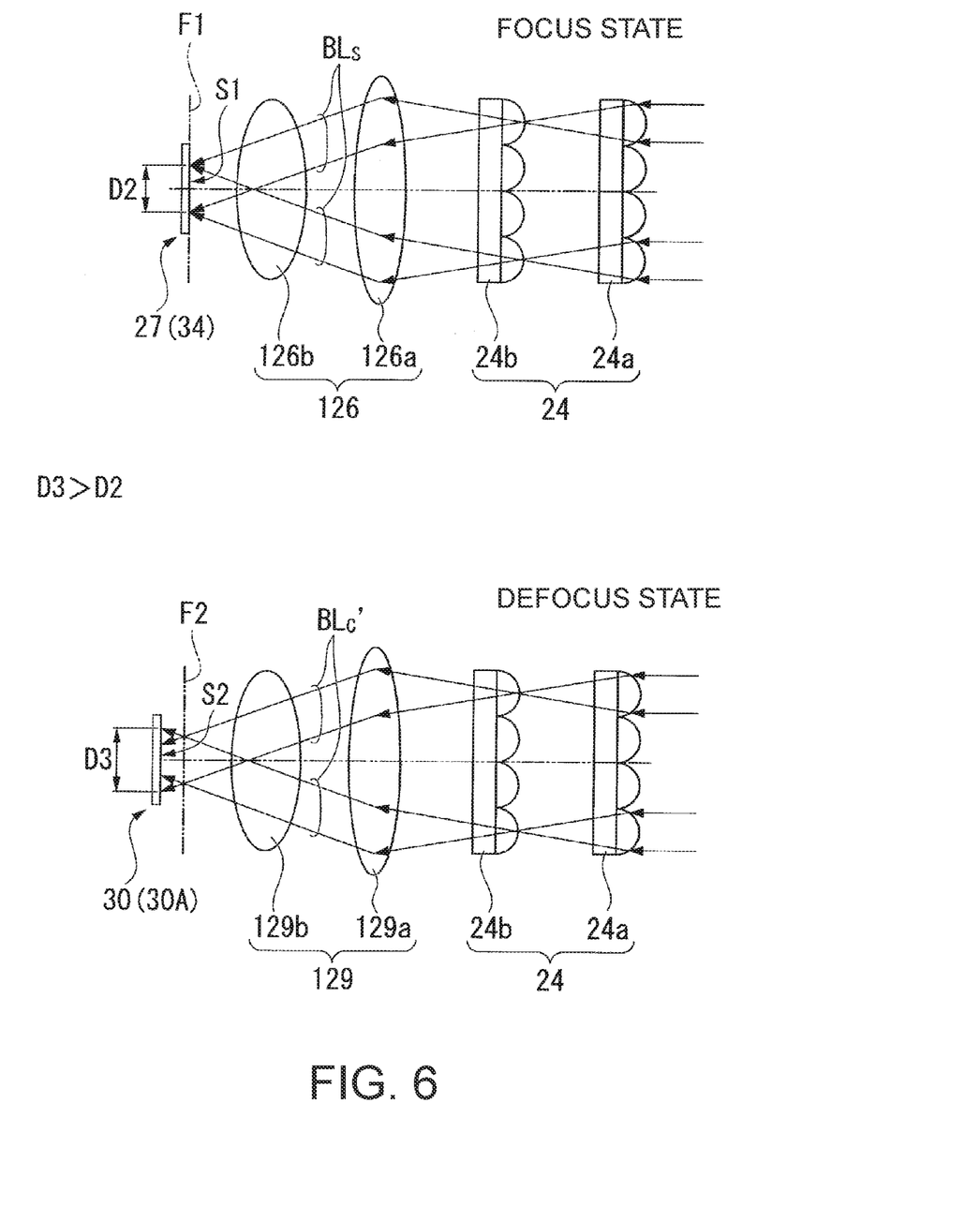
FIG. 6 is a view describing arrangements of first and second light condensing optical systems.

FIG. 6 is a view describing an arrangement of the first light condensing optical system 126 and an arrangement of the second light condensing optical system 129.

As illustrated in FIG. 6, in the embodiment, a relative position between the first light condensing optical system 126 and the fluorescent light emitting element 27 is set so that the fluorescent body layer 34 is positioned in a focal point position F1 of the first light condensing optical system 126.

In addition, in the embodiment, a relative position between the second light condensing optical system 129 and the diffusion reflection element 30 is set so that the diffusion reflection plate 30A is positioned in a position (rear side further than a focal point position F2) different from the focal point position F2 of the second light condensing optical System 129.

That is, in the embodiment, the second light condensing optical system 129 causes a spot S2 of the light beam flux BLc on the diffusion reflection element 30 (diffusion reflection plate 30A) to be in a defocus state and the first light condensing optical system 126 causes a spot S1 of the light beam, flux BLs on the fluorescent body layer 34 to be in a focus state.

Therefore, a size D3 of the spot S2 of the light beam flux BLc on the diffusion reflection element 30, which is in the defocus state, is greater than a size D2 of the spot S1 of the light beam flux BLs on the fluorescent body layer 34 which is in the focus state.

Also in the embodiment, the defocus state of the spot S2 of the light beam flux BLc is set so as to satisfy the condition of $D3=\beta+D2$. Therefore, the size D3 of the light emitting region of the diffusion reflection element 30 is equal to the size D1 of the light emitting region H1 of the fluorescent body layer 34. In addition, the spot S2 of the light beam flux BLc may be in the defocus state by disposing the diffusion reflection plate 30A on a front side further than the focal point position F2.

Therefore, also in the light source device 102 of the embodiment, the lighting light WL in which color unevenness is reduced is obtained.

In addition, the invention is not intended to be necessarily limited to the configuration of the embodiments described above and it is possible to make various changes without departing from the scope of the invention.

In the embodiments described above, an example in which the lighting apparatus according to the invention is mounted on the projector is illustrated, but the invention is not limited to the embodiments. The lighting apparatus according to the invention can also be applied to lighting equipment, a headlight of an automobile, and the like.

The entire disclosure of Japanese Patent Application No. 2015-122661, filed on Jun. 18, 2015 is expressly incorporated by reference herein.

What is claimed is:

1. A light source device comprising:
a light source;
a light separating and synthesizing unit that separates a light beam flux from the light source into a first light beam flux and a second light beam flux;
a fluorescent body layer on which the first light beam flux is incident;
a diffusive reflector on which the second light beam flux is incident;
a first lens unit that is provided in an optical path of the first light beam flux between the light separating and synthesizing unit and the fluorescent body layer; and
a second lens unit that is provided in an optical path of the second light beam flux between the light separating and synthesizing unit and the diffusive reflector,
wherein fluorescent light emitted from the fluorescent body layer and diffused light emitted from the diffusive reflector are synthesized by the light separating and synthesizing unit, and
wherein a size of a spot of the second light beam flux on the diffusive reflector is greater than a size of a spot of the first light beam flux on the fluorescent body layer.

2. The light source device according to claim 1,
wherein a focal length of the second lens unit is longer than a focal length of the first lens unit.
3. The light source device according to claim 1,
wherein a size of a spot of the second light beam flux on the diffusive reflector is approximately equal to a size of a light emitting region of the fluorescent body layer.
4. The light source device according to claim 1,
wherein the second lens unit causes a spot of the second light beam flux on the diffusive reflector to be in a defocus state.
5. The light source device according to claim 1,
wherein when a size of the light emitting region is D1, a size of a spot of the first light beam flux is D2, and a size of a spot of the second light beam flux is D3, the following condition is satisfied;

$$|D1-D3|<|D1-D2|.$$

6. A lighting apparatus comprising:
the light source device according to claim 1; and
a uniform lighting optical system on which light emitted from the light source device is incident.
7. A lighting apparatus comprising:
the light source device according to claim 2; and
a uniform lighting optical system on which light emitted from the light source device is incident.
8. A lighting apparatus comprising:
the light source device according to claim 3; and
a uniform lighting optical system on which light emitted from the light source device is incident.
9. A lighting apparatus comprising:
the light source device according to claim 4; and
a uniform lighting optical system on which light emitted from the light source device is incident.
10. A lighting apparatus comprising:
the light source device according to claim 5; and
a uniform lighting optical system on which light emitted from, the light source device is incident.
11. A projector comprising:
the lighting apparatus according to claim 6;
a light modulation device that, forms image light by modulating, in accordance with image information, light emitted from the lighting apparatus; and
a projection optical system that projects the image light.
12. A projector comprising:
the lighting apparatus according to claim 7;
a light modulation device that forms image light by modulating, in accordance with image information, light emitted from the lighting apparatus; and
a projection optical system that projects the image light.
13. A projector comprising:
the lighting apparatus according to claim 8;
a light modulation device that forms image light by modulating, in accordance with image information, light emitted from, the lighting apparatus; and
a projection optical system that projects the image light.
14. A projector comprising:
the lighting apparatus according to claim 9;
a light modulation device that forms image light by modulating, in accordance with image information, light emitted from the lighting apparatus; and
a projection optical system that projects the image light.
15. A projector comprising:
the lighting apparatus according to claim 10;
a light modulation device that forms image light by modulating, in accordance with image information, light emitted from the lighting apparatus; and
a projection optical system that projects the image light.

* * * * *